(12) United States Patent  (10) Patent No.: US 7,118,290 B2
Ishigami et al.  (45) Date of Patent: Oct. 10, 2006

(54) FERRULE BLOCK AND OPTICAL MODULE USING THE SAME

(75) Inventors: Yoshiaki Ishigami, Hitachi (JP); Yoshinori Sunaga, Hitachinaka (JP)

(73) Assignee: Hitachi Cable, Ltd., Tokyo (JP)

( * ) Notice: Subject to any disclaimer, the term of this patent is extended or adjusted under 35 U.S.C. 154(b) by 0 days.

(21) Appl. No.: 10/986,319

(22) Filed: Nov. 12, 2004

(65) Prior Publication Data

US 2005/0105857 A1 May 19, 2005

(30) Foreign Application Priority Data

Nov. 17, 2003 (JP) ............................. 2003-386757
Jun. 29, 2004 (JP) ............................. 2004-191712

(51) Int. Cl.
G02B 6/36 (2006.01)
G02B 6/42 (2006.01)

(52) U.S. Cl. ............................. 385/78; 385/88; 385/84; 385/92

(58) Field of Classification Search ...................... None
See application file for complete search history.

(56) References Cited

U.S. PATENT DOCUMENTS 4,167,744 A * 9/1979 Nyul ............................. 257/98
4,215,913 A * 8/1980 Turley et al. .................. 385/64
4,753,510 A * 6/1988 Sezerman ..................... 385/61
6,357,932 B1 * 3/2002 Auld ............................ 385/76
6,817,782 B1 * 11/2004 Togami et al. ................ 385/92
6,848,836 B1 * 2/2005 Ueda et al. ................... 385/78
2003/0169978 A1 * 9/2003 Sato et al. ..................... 385/88

FOREIGN PATENT DOCUMENTS

| JP | 5-45609 U | 6/1993 |
| JP | 9-033759 A | 2/1997 |
| JP | 9-061673 A | 3/1997 |
| JP | 9-304652 A | 11/1997 |

* cited by examiner

Primary Examiner—Rodney B Bovernick
Assistant Examiner—Omar Rojas
(74) Attorney, Agent, or Firm—Foley & Lardner LLP

(57) ABSTRACT

A ferrule block comprises a ferrule block body which is attached to an optical device module, which houses in its package an optical device for sending or receiving a light signal, to optically couple to an optical fiber communicating between the optical device module and an external optical communication system and a shell made of an insulating material which is provided at the tip of the ferrule block body, wherein a flange which hits against the tip of the ferrule block body is provided on the outer periphery of the shell.

24 Claims, 13 Drawing Sheets

FERRULE BLOCK AND OPTICAL MODULE USING THE SAME

The present application is based on Japanese patent application Nos. 2003-386757 and 2004-191712, the entire contents of which are incorporated herein by reference.

BACKGROUND OF THE INVENTION

1. Field of the Invention

The present invention relates to a ferrule block which is attached to an optical device module to optically couple to an optical fiber serving as a transmission line, and to an optical module using the same.

2. The Related Art of the Invention

A ferrule block is attached to an optical device module, which houses in its package an optical device for sending or receiving a light signal, to optically couple to an optical fiber serving as a transmission line, and is also referred to as a capillary block or a receptacle.

FIG. 1 shows a ferrule block 131 as an example of such a ferrule block. The ferrule block 131 primarily includes a substantially cylindrical ferrule block body 132 made of metal and a substantially cylindrical shell 133 made of metal which is provided at one end of the ferrule block body 132 so as to partly project therefrom.

At one end of the ferrule block body 132, one end of the shell 133 is press fitted and fixed. At the other end of the ferrule block body 132, a ferrule (capillary) 135 holding an optical fiber 134 in its center is fixed.

The ferrule block 131 is, in use, attached to a metal casing 136 of an electronic device so that the ferrule block body 132 is housed within the casing 136 and the one end of the shell 133 projects outside the casing 136. In FIG. 1, the left side of the casing 136 shows an inside of the casing 136 and the right side of the casing 136 shows an outside of the casing 136, wherein the other end of the optical fiber 134 is optically coupled to an optical device (not shown).

In this state, an optical connector not shown, which includes an optical fiber serving as a transmission line and a ferrule holding the optical fiber, is further connected to the one end of the shell 133. This allows the optical device, the optical fiber 134, and the optical fiber of the optical connector to be optically coupled.

Since the shell 133 is metallic, it is inexpensive and can be press fitted into the ferrule block body 132 even if a tolerance between an inside diameter of the ferrule block body 132 and an outside diameter of the shell 133 is loose.

Meanwhile, there is an earlier art relating to the invention disclosed in the present application (refer to Japanese Unexamined Patent Publication No. 9-304652 (FIG. 1)).

However, since the shell 133 is metallic and moreover the shell 133 projects outside the casing 136, the ferrule block 131, when incorporated in an electronic device which operates under low-frequency signals, does not present any problems, but when incorporated in an electronic device which operates under high-frequency signals, the ferrule block 131 has a problem that the shell 133 functions as an antenna and tends to pick up an electromagnetic noise e1 from the outside during the operation of the electronic device. The ferrule block 131 also has a problem that it is easy to emit an electromagnetic noise e2 to the outside.

In particular, a recent optical transceiver has a very fast transmission speed of 10 Gbps or more. Accordingly, incorporating the ferrule block 131 into such a transceiver will significantly increase the influence of the electromagnetic noises e1 and e2.

SUMMARY OF THE INVENTION

It is an object of the present invention to provide a ferrule block which resists picking up an electromagnetic noise from the outside and emitting an electromagnetic noise to the outside, and an optical module using the same.

According to one aspect of the present invention, a ferrule block comprises, a ferrule block body which is attached to an optical device module, which houses in a package thereof an optical device for sending or receiving a light signal, to optically couple to an optical fiber communicating between the optical device module and an external optical communication system, and a shell made of an insulating material which is provided at a tip of the ferrule block body, wherein:

a flange which hits against the tip of the ferrule block body is provided on an outer periphery of the shell.

The insulating material is preferably ceramic and the shell may be press fitted and fixed to the ferrule block body.

Alternatively, the insulating material may be plastic, and in this case, the shell is preferably inserted into the ferrule block body and fixed by an adhesive.

It is preferable that the shell and the ferrule block body each be provided with respective engaging sections which engage with each other.

A metal ring for press fitting the shell into the ferrule block body may be provided on the outer periphery of the shell.

The metal ring is preferably insert molded into the shell.

The ferrule block body may be provided with a throughhole which penetrates from the outer periphery of the ferrule block body to an insertion hole, into which the shell is inserted.

According to a further aspect of the present invention, an optical module comprises, a ferrule block which comprises, a ferrule block body which is attached to an optical device module, which houses in a package thereof an optical device for sending or receiving a light signal, to optically couple to an optical fiber communicating between the optical device module and an external optical communication system, and a shell made of an insulating material which is provided at a tip of the ferrule block body, wherein:

a flange which hits against the tip of the ferrule block body is provided on an outer periphery of the shell.

The insulating material is preferably ceramic and the shell may be press fitted and fixed to the ferrule block body.

Alternatively, the insulating material may be plastic, and in this case, the shell is preferably inserted into the ferrule block body and fixed by an adhesive.

It is preferable that the shell and the ferrule block body each be provided with respective engaging sections which engage with each other.

A metal ring for press fitting the shell into the ferrule block body may be provided on the outer periphery of the shell.

The metal ring is preferably insert molded into the shell.

The ferrule block body may be provided with a throughhole which penetrates from the outer periphery of the ferrule block body to an insertion hole, into which the shell is inserted.

ADVANTAGES OF THE INVENTION

According to the present invention, the following advantages will be achieved.

(1) A ferrule block resists picking up an electromagnetic noise from the outside and emitting an electromagnetic noise to the outside.

(2) A shell can easily be positioned in the direction of optical axis with respect to a ferrule block body.

These and other objects, features, aspects and advantages of the present invention will become apparent to those skilled in the art from the following detailed description, which, taken in conjunction with the annexed drawings, discloses a preferred embodiments of the present invention.

BRIEF DESCRIPTION OF THE DRAWINGS

The preferred embodiments according to the invention will be explained below referring to the drawings, wherein.

DETAILED DESCRIPTION OF THE PREFERRED EMBODIMENTS

First Preferred Embodiment

First, referring to FIG. 3 and FIG. 4, a laser diode (hereinafter referred to as LD) module as an optical device module, equipped with a ferrule block in a first preferred embodiment, and an optical module using the ferrule block in the first preferred embodiment will be explained.

Figure 3:
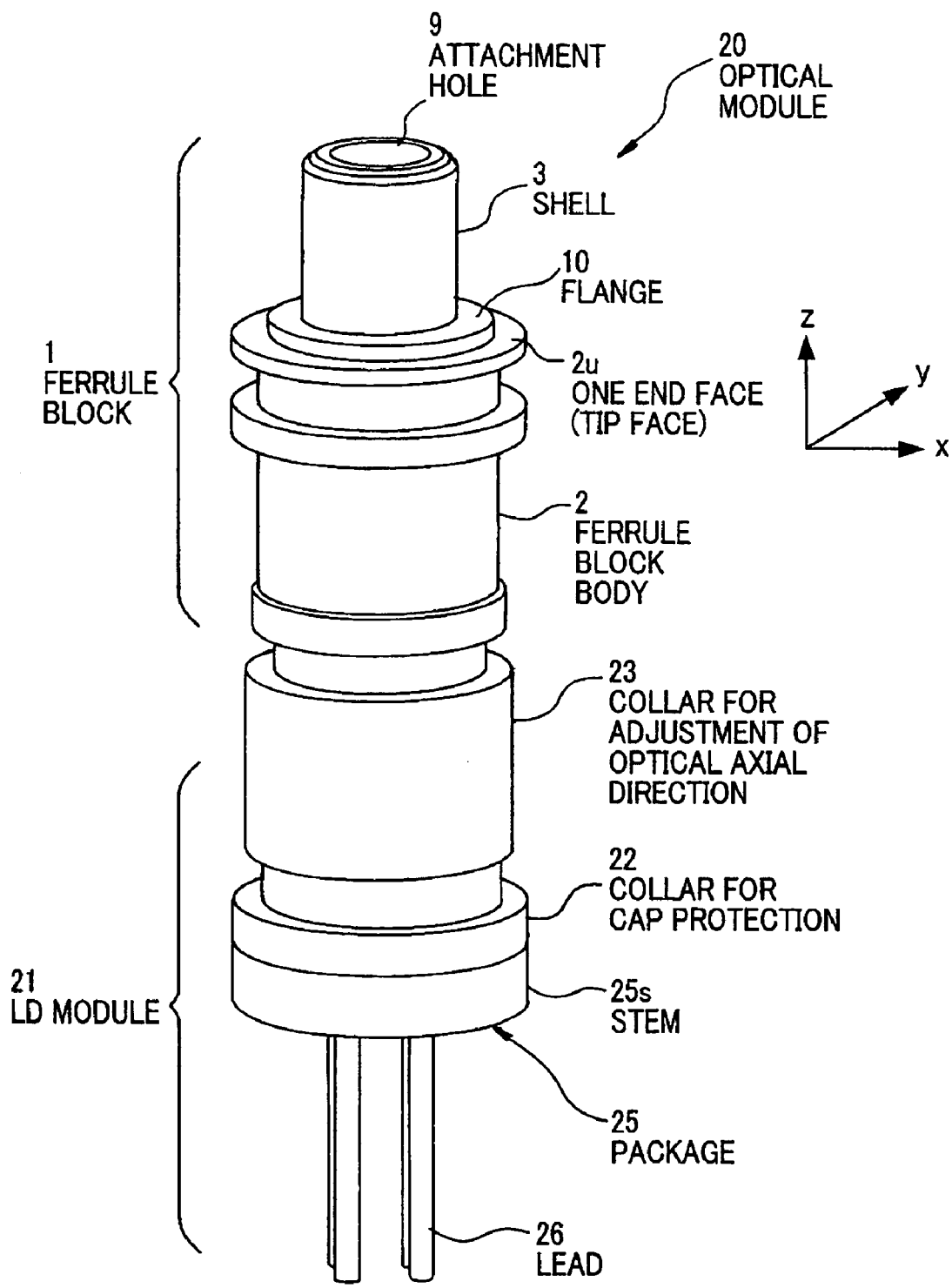
FIG. 3 is an outline view showing an optical module using the ferrule block shown in FIG. 2.
Figure 4:
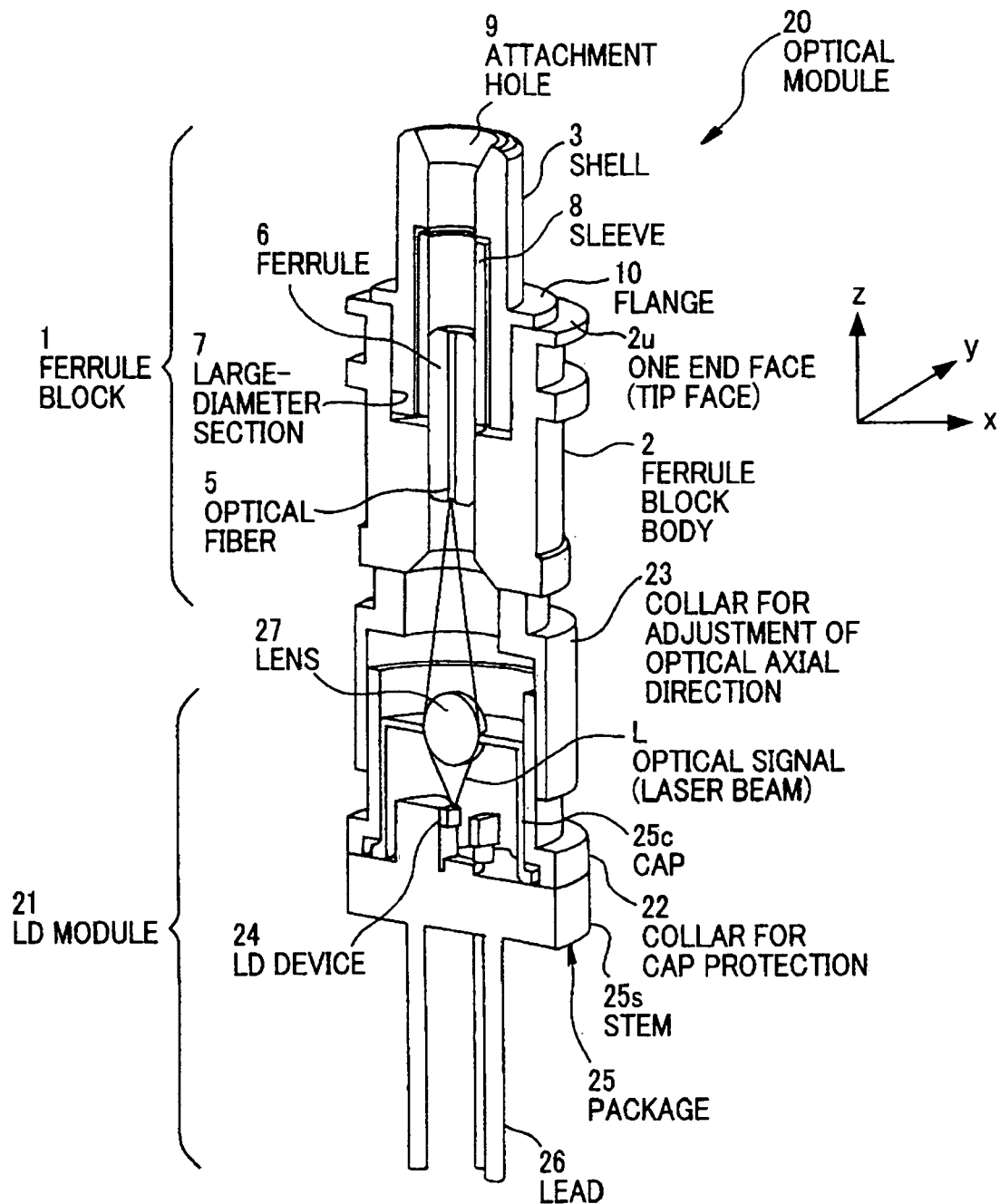
FIG. 4 is a longitudinal sectional view of the arrangement of FIG. 3.

FIG. 3 is an outline view showing an optical module using a ferrule block in the first preferred embodiment according to the present invention, and FIG. 4 is a longitudinal sectional view thereof.

As shown in FIG. 3 and FIG. 4, a ferrule block 1 is attached to the upper side of an LD module 21 corresponding to the direction of light emission from the LD module 21 (the direction of +z in FIG. 3 and FIG. 4) via a metal collar 22 for cap protection and a metal collar 23 for adjustment of optical axial direction to be hereinafter described.

An optical module 20 using the ferrule block 1 comprises the ferrule block 1, the LD module 21, the collar 22 for cap protection, and the collar 23 for adjustment of optical axial direction.

The LD module 21 is principally configured by housing an LD device 24 as an optical device sending a light signal L in a metal package 25. The package 25 is formed of a disk-like stem 25s to fix the LD device 24 and a substantially cylindrical cap (lens cap) 25c to cover the top face of the stem 25s and the LD device 24. This package 25, generally called a Can package, is most commonly used as an inexpensive LD module package housing the LD device 24. The stem 25s and the cap 25c are fixed together by resistance welding so that the cap 25c (package 25) is filled with an inert gas such as $N_2$ and the air-tightness thereof is maintained.

A plurality of leads 26 to electrically connect parts such as the LD device 24 in the package 25 with parts outside the package 25 is attached to the stem 25s in such a manner as to vertically penetrate through the stem 25s, i.e., to vertically penetrate through the package 25. When an electrical signal is applied to the LD device 24 through one lead 26 from a part outside the package 25, the LD device 24 converts the electrical signal into a light signal (laser beam) L and sends (emits) it upward. On the top of the cap 25c, there is attached a lens 27, which collects the laser beam L from the LD device 24 at the other end of the optical fiber 5 within the ferrule block 1. The other end of the optical fiber 5 is optically coupled to the LD device 24 when the ferrule block 1 is attached to the LD module 21 via the collar 22 for cap protection and the collar 23 for adjustment of optical axial direction.

On the outer periphery of the cap 25c, the collar 22 for cap protection of substantially cylindrical form is fitted, and on the outer periphery of the collar 22 for cap protection, the collar 23 for adjustment of optical axial direction is fitted, and further on the collar 23 for adjustment of optical axial direction, the ferrule block 1 is fitted.

The collar 22 for cap protection is a connecting member for connecting the cap 25c with the collar 23 for adjustment of optical axial direction to maintain the air-tightness in the cap 25c because direct welding of the cap 25c and the collar 23 for adjustment of optical axial direction may cause the weld to penetrate through the cap 25c.

The collar 23 for adjustment of optical axial direction is a connecting member for connecting the cap 25c with the ferrule block 1. This collar 23 for adjustment of optical axial direction is made movable in the direction of optical axis (the direction of ±z in FIG. 3 and FIG. 4) when fitted on the outer periphery of the cap 25c. Moving the collar 23 for adjustment of optical axial direction as appropriate in the direction of optical axis enables an adjustment such that the light signal L is collected by the lens 27 at the other end of the optical fiber 5.

More specifically, the stem 25s and the collar 22 for cap protection are fixed together by resistance welding. The collar 22 for cap protection and the collar 23 for adjustment of optical axial direction are fixed together by simultaneous multi-point welding using a YAG laser after the collar 23 for adjustment of optical axial direction is adjusted in the direction of the optical axis (the direction of ±z in FIG. 3 and FIG. 4). The collar 23 for adjustment of optical axial direction and the ferrule block 1 are fixed together by simultaneous multi-point welding using an YAG laser after the ferrule block 1 is adjusted in the optical axial direction and the horizontal direction (the directions of ±x and ±y in FIG. 3 and FIG. 4).

Figure 1:
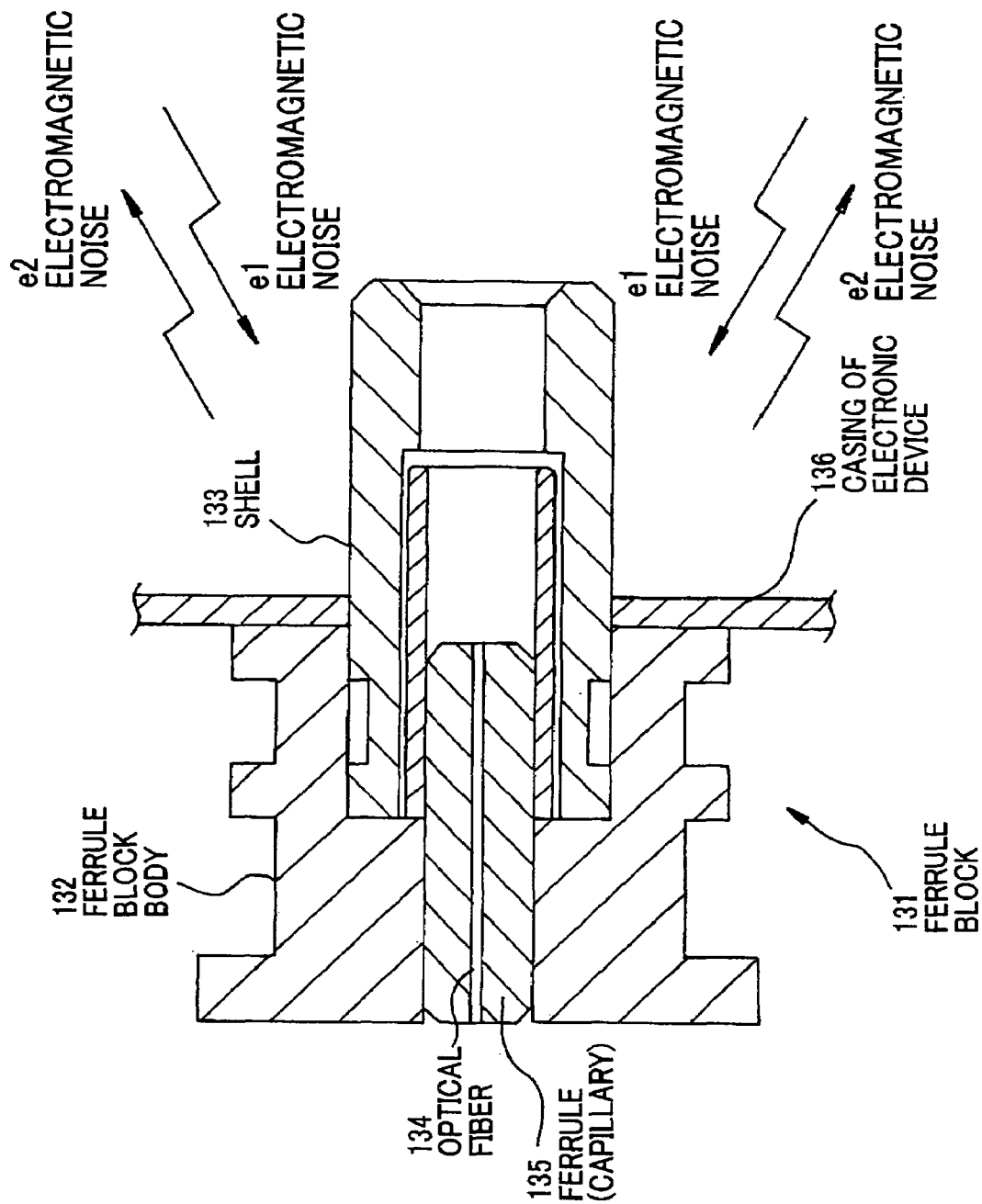
FIG. 1 is an enlarged longitudinal sectional view showing the ferrule block described in the related art of the invention.
Figure 2:
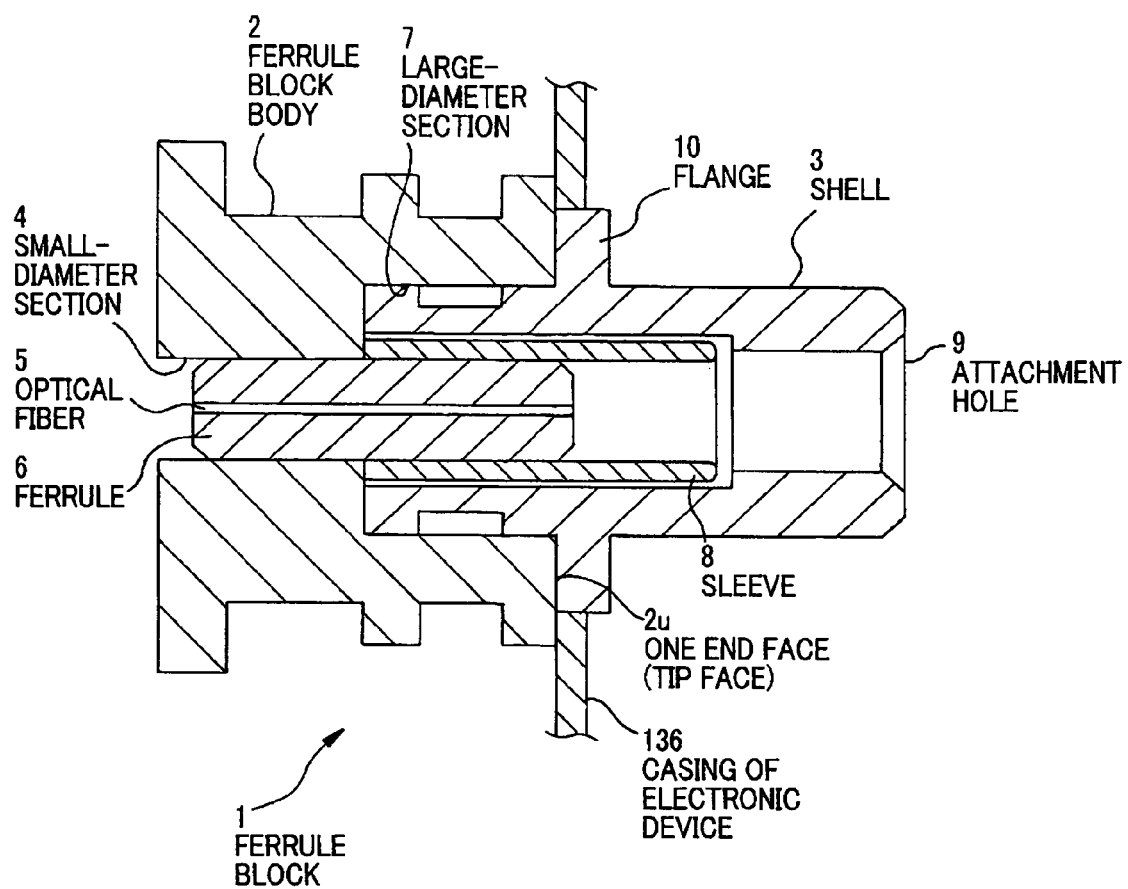
FIG. 2 is an enlarged longitudinal sectional view showing a ferrule block in a first preferred embodiment according to the present invention.

Next, FIG. 2 is an enlarged longitudinal sectional view showing a ferrule block in the first preferred embodiment according to the present invention.

As shown in FIG. 2 to FIG. 4, the ferrule block 1 in the first preferred embodiment according to the present invention mainly comprises the substantially cylindrical ferrule block body 2 made of metal, which is attached to the LD module 21 shown in FIG. 3 and FIG. 4 to optically couple to an optical fiber (refer to FIG. 5) communicating between the LD module 21 and an external optical communications system not shown, and the substantially cylindrical shell 3 made of an insulating material, which is provided at one end (tip) of the ferrule block body 2 so as to partly project therefrom.

The ferrule block body 2 is formed out of a metallic material such for example as SUS304 or SUS430. The insulating material forming the shell 3 may be ceramic or plastic (resin).

The other end of the ferrule block body 2 has a small-diameter section 4 formed therein, and the one end of the ferrule block body 2 has a large-diameter section 7 formed therein, which communicates with the small-diameter section 4 and has an inside diameter slightly larger than the outside diameter of the shell 3.

The small-diameter section 4 is an insertion hole, into which a ferrule 6 is inserted. The ferrule 6 which holds an optical fiber 5 in its center is inserted and fixed in the small-diameter section 4 so that the optical fiber 5 and one end of the ferrule 6 project from the small-diameter section 4 into the large-diameter section 7.

On the outer periphery of the ferrule 6 projecting from the small-diameter section 4, a sleeve 8 is fitted so as to project from the large-diameter section 7. The sleeve 8 is used for axial alignment between the optical fiber 5 in the ferrule 6 and the optical fiber (refer to FIG. 5) included by an optical connector not shown to be hereinafter described. In the present example, a split sleeve is used as the sleeve 8.

The large-diameter section 7 is an insertion hole, into which the other end of the shell 3 is inserted. The other end of the shell 3 is inserted and fixed in the large-diameter section 7 so that the other end of the shell 3 covers the outer periphery of the sleeve 8 and the one end of the shell 3 projects from the large-diameter section 7.

At the center of the outer periphery of the shell 3, there is provided a flange 10, which, when the other end of the shell 3 is inserted into the large-diameter section 7 of the ferrule block body 2, strikes one end face (tip face) 2*u* of the ferrule block body 2 to make a surface-to-surface contact therewith. The material of the flange 10 is the same as that of the shell 3.

When the shell 3 made of ceramic is used, the other end of the shell 3 is press fitted and fixed to the large-diameter section 7. On the other hand, when the shell 3 made of plastic is used, an adhesive is applied to the inner peripheral surface of the large-diameter section 7 or the other end of the shell 3 and the other end of the shell 3 is inserted and fixed in the large-diameter section 7, and in addition, the one end of the ferrule 6 is inserted and fixed in this other end of the shell 3.

The one end of the shell 3 includes an attachment hole 9 which a ferrule (refer to FIG. 5) of the optical connector (not shown) is inserted in and removed from.

The ferrule block 1 thus configured is, in use, attached to the metal casing 136 of an electronic device so that the ferrule block body 2 is housed within the casing 136 and the one end of the shell 3 projects outside the casing 136 as shown in FIG. 2 after having been attached to the LD module 21 via the collar 22 for cap protection and the collar 23 for adjustment of optical axial direction as explained in FIG. 3 and FIG. 4. On this occasion, the one end face of the ferrule block body 2 is brought into contact with the inner surface of the casing 136. In FIG. 2, the left side of the casing 136 shows the inside of the casing and the right side of the casing 136 shows the outside of the casing 136.

In this state, an optical connector (not shown )(refer to FIG. 7), which includes an optical fiber serving as a transmission line and a ferrule holding the optical fiber in its center, is further connected to the one end of the shell 3. This allows the LD device 24, the optical fiber 5, and the optical fiber of the optical connector to be optically coupled.

The operation of the present preferred embodiment will now be explained below.

The ferrule block 1 has the shell 3 provided at the tip of the ferrule block body 2 so as to partly project therefrom. The shell 3 is made of an insulating material, so that even if the ferrule block 1 is incorporated in an electronic device which operates under high-frequency signals and the shell 3 projects from the casing 136 of the electronic device, the shell 3 never functions as an antenna during the operation of the electronic device. This is because the shell 3 is not influenced by a potential (for example 3.5 V) that the package 25 bears during the operation of the LD module 21.

Therefore, the ferrule block 1 provides such a structure that resists picking up an electromagnetic noise from the outside and is hard to emit an electromagnetic noise to the outside.

Especially, the ferrule block 1 is hardly influenced by the electromagnetic noise from the outside and hardly exerts an influence of the electromagnetic noise on the outside. Accordingly, it is suggested that the ferrule block 1 be incorporated in an optical transceiver having a transmission speed of 10 Gbps or more.

Further, since the ferrule block body 2 housed within the casing 136 is formed of a metallic material such as SUS304 or SUS430, the ferrule block 1 can radiate heat effectively through the metal casing 136.

Furthermore, since the ferrule block 1 has the flange 10 provided on the outer periphery of the shell 3, the shell 3 can be easily positioned in the direction of optical axis with respect to the ferrule block body 2.

The shell 3 made of ceramic is more difficult to mold than the shell 3 made of plastic. However, the shell 3 made of ceramic has a low coefficient of linear expansion, and consequently it is most suitable for press fitting into the ferrule block body 2 and has the advantages that it is resistant to expansion or contraction after press fitting and has a high reliability in retaining the fixing to the ferrule block body 2, thus being free from rattling.

Since the shell 3 made of plastic cannot be press fitted into the ferrule block body 2, it requires use of an adhesive and therefore compares somewhat unfavorably with the shell 3 made of ceramic in the reliability of retaining the fixing to the ferrule block body 2, but it has the advantage of being easy to mold.

Figure 5:
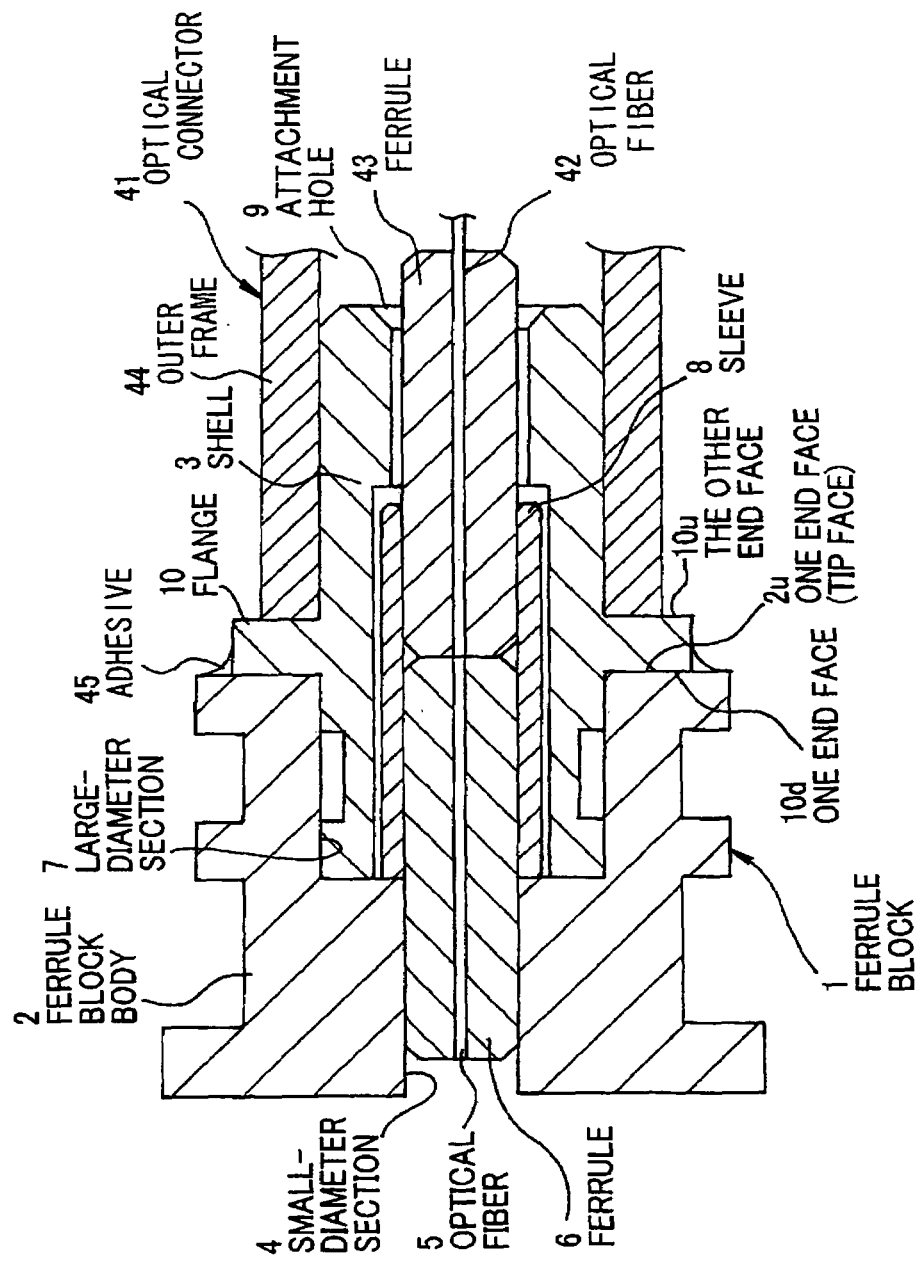
FIG. 5 is an enlarged longitudinal sectional view showing the ferrule block shown in FIG. 2 connected to an optical connector.

FIG. 5 is an enlarged longitudinal sectional view showing the ferrule block 1 shown in FIG. 2 connected to an optical connector 41.

The optical connector 41 includes an optical fiber 42 serving as a transmission line and the ferrule 6 holding the optical fiber 42 in its center, connected to the one end of the shell 3. The optical fiber 42 communicates between the LD module 21 in FIG. 3 and FIG. 4 and an external optical communications system not shown.

On this occasion, the optical fiber 5 within the ferrule 6 and the optical fiber 42 within a ferrule 43 are butt-connected. The outer frame 44 of the optical connector 41 strikes and makes surface-to-surface contact with one end face (tip face) 10u of the flange 10 of the shell 3.

As a result, the adhesive 45 applied to the inner peripheral surface of the large-diameter section 7 or the other end of the shell 3 hardly reaches the one end face 10u of the flange 10, although, when applied too much, it may run out from between the one end face 2u of the ferrule block body 2 and the other end face (rear end face) 10d of the flange 10.

Therefore, when the shell 3 made of plastic is used, the ferrule block 1 can prevent the adhesive 45 from touching the outer frame 44 of the optical connector 41, and the optical connector 41 can be connected to the one end of the shell 3 with a high degree of precision, whereby optical coupling losses are reduced.

The other preferred embodiments to be explained with reference to FIG. 6 to FIG. 13 use a shell made of plastic, which should be fixed to a ferrule block body by an adhesive unless otherwise specified.

Since the optical module 20 with this ferrule block 1 is not only less influenced by an electromagnetic noise and has a high thermal radiation capability but also can easily be optically coupled to the ferrule block 1 and the optical fibers 5 and 42, it is easy to assemble.

Second Preferred Embodiment

Next, a second preferred embodiment will be explained.

Figure 6:
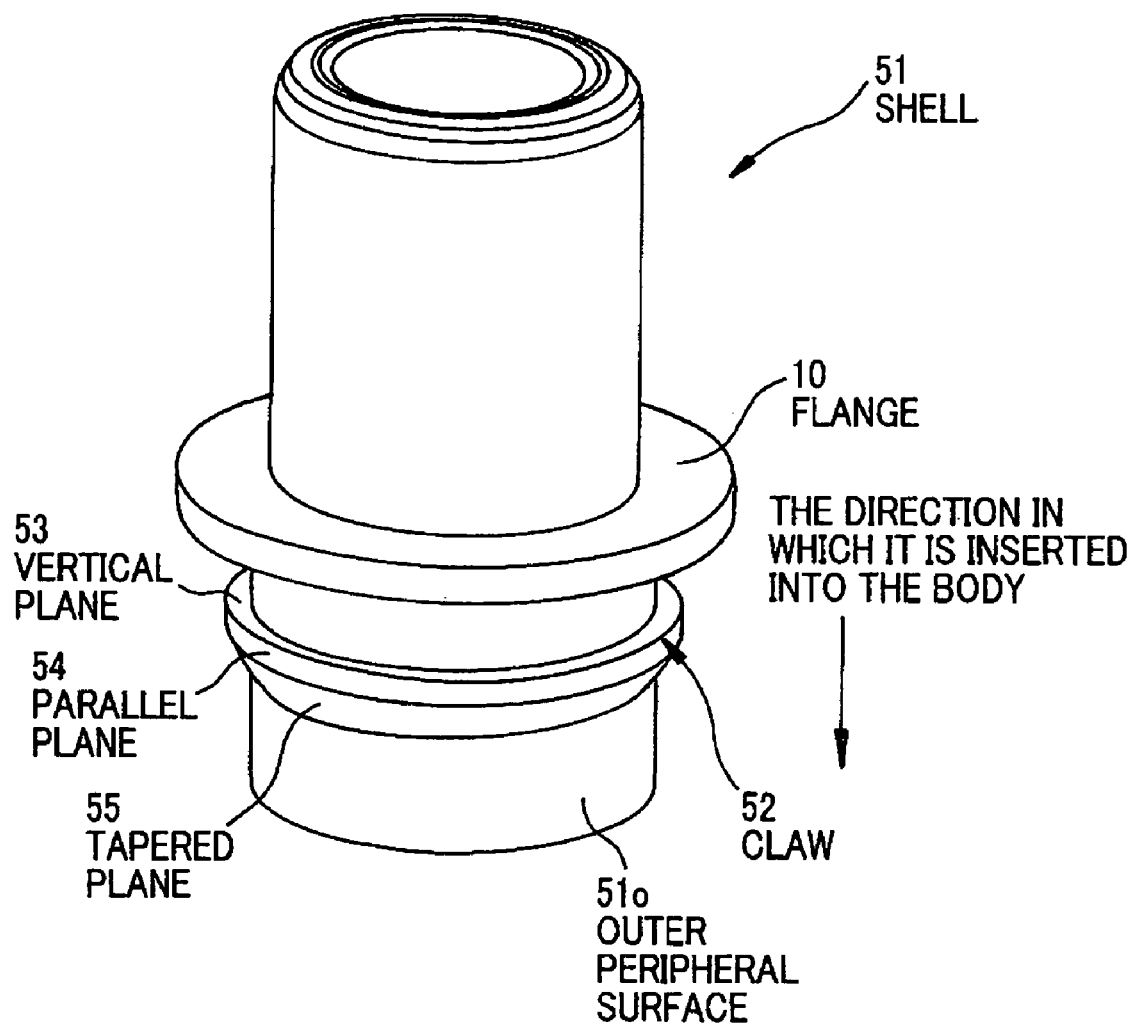
FIG. 6 is an outline view showing a shell in a second preferred embodiment according to the present invention.
Figure 7:
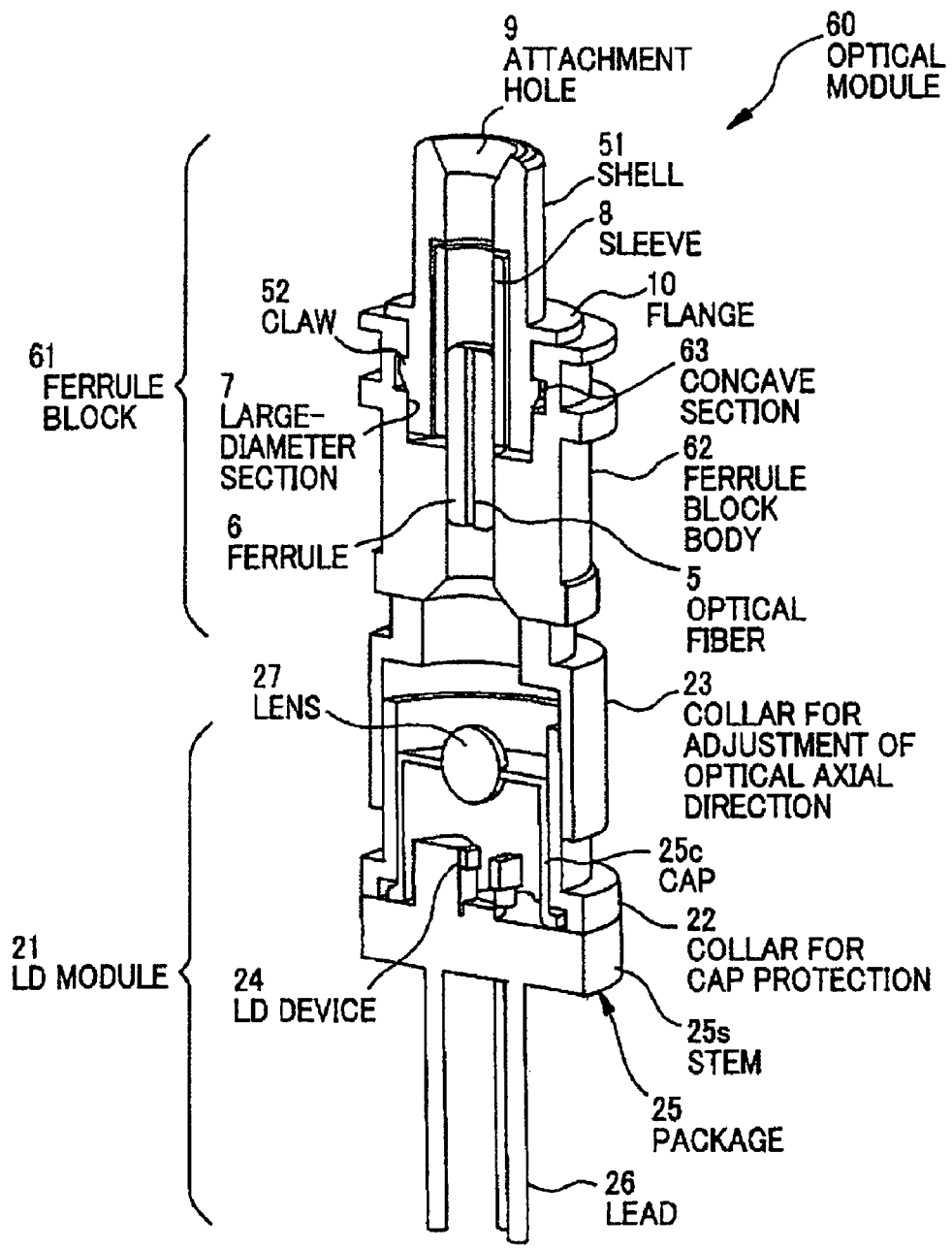
FIG. 7 is an outline view showing an optical module using a ferrule block in the second preferred embodiment according to the present invention.

FIG. 6 is an outline view showing a shell in the second preferred embodiment according to the present invention and FIG. 7 is an outline view showing an optical module using a ferrule block in the second preferred embodiment according to the present invention.

As shown in FIG. 6 and FIG. 7, a shell 51 in the second preferred embodiment is, in addition to the configuration of the shell 3 in FIG. 2 to FIG. 4, provided on the other end side (the lower side in FIG. 6) relative to the flange 10, i.e., on its outer periphery corresponding to the side of the direction in which the shell 51 is inserted into a ferrule block body 62, with a substantially annular claw 52, which engages as a male engaging section with a concave section 63 of the ferrule block body 62 to be hereinafter described, all around the periphery.

The claw 52 includes a vertical plane 53 projecting from the outer peripheral surface 51 of the shell 51 vertically with respect to the axial direction of the shell 51, a parallel plane 54 extending from the vertical plane 53 parallel to the other end side in the axial direction of the shell 51, and a tapered plane 55 tapered from the parallel plane 54 to the outer peripheral surface 51o on the other end side of the shell 51.

On the other hand, the ferrule block body 62 is provided on its inner periphery corresponding to the other end side of the large-diameter section 7 with the annular concave section 63, which engages as a female engaging section with the claw 52 of the shell 51, all around the periphery. The ferrule block 61 in the second preferred embodiment mainly comprises the ferrule block body 62 and the shell 51 stated above.

An optical module 60 using the ferrule block 61 comprises the ferrule block 61, an LD module 21, a collar 22 for cap protection, and a collar 23 for adjustment of optical axial direction.

In the ferrule block 61, when the shell 51 is inserted into the ferrule block body 62, and the vertical plane 53 of the claw 52 of the shell 51 finally reaches the concave section 63 of the ferrule block body 62, the claw 52 fits into the concave section 63 and they engage with each other, with the result that the shell 51 is fixed in the ferrule block body 62. Even if an attempt to pull the shell 51 out of the ferrule block body 62 is made in this state, the vertical plane 53 of the claw 62 is caught in the concave section 63. This enables the ferrule block 61, in case the adhesive deteriorates, to prevent the worst case where the shell 51 falls off the ferrule block body 62.

Further, in the ferrule block 61, the claw 52 of the shell 51 and the concave section 63 of the ferrule block body 62 engage with each other, and therefore the shell 71 can be fixed in the ferrule block body 62 without using an adhesive.

Figure 8:
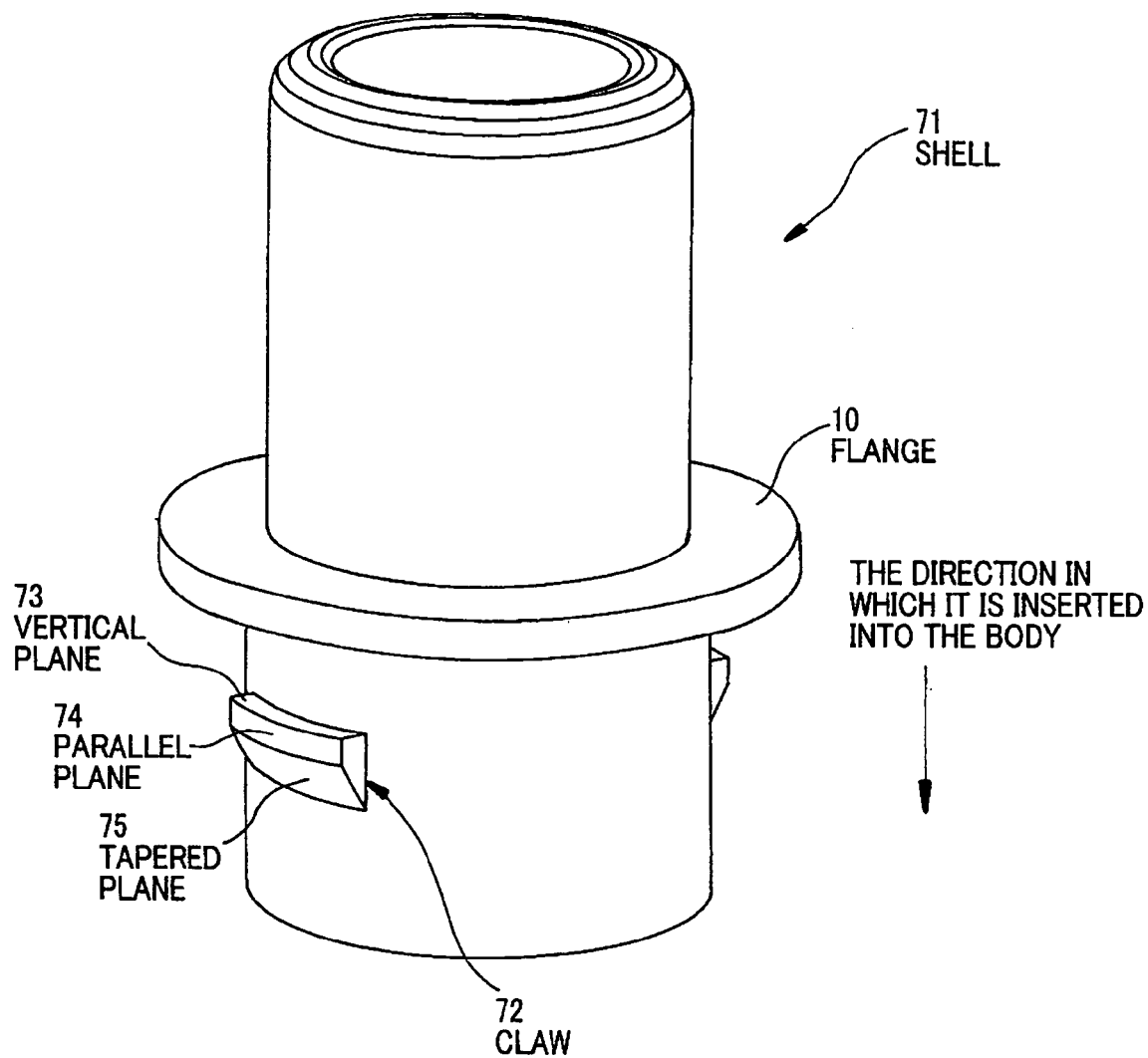
FIG. 8 is an outline view showing an example of the shell.

In the shell 51 in the second preferred embodiment, the claw 52 is provided around the entire outer periphery of the shell 51, but instead of the shell 51, the shell 71 which has at least two claws 72 of substantially annular piece form symmetrically disposed partly on the outer periphery, may be used as shown in FIG. 8. The claw 72 includes a vertical plane 73, a parallel plane 74, and a tapered plane 75, as is the case with the claw 52 in FIG. 6 and FIG. 7. The shell 71 has the advantage of being easier to insert into the ferrule block body 62 in FIG. 7, as compared to the shell 51 in FIG. 6 and FIG. 7.

Third Preferred Embodiment

Next, a third preferred embodiment will be explained.

Figure 9:
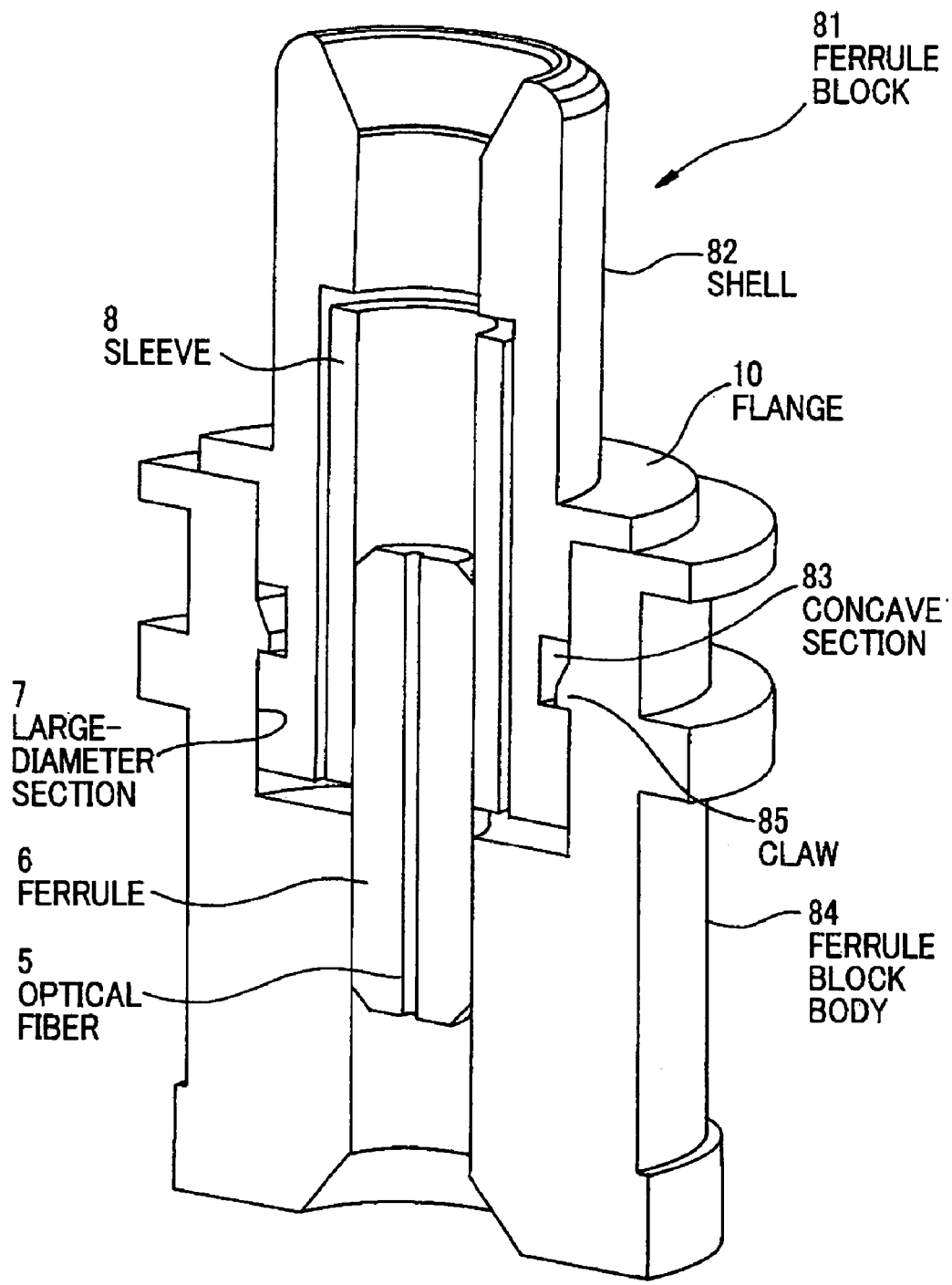
FIG. 9 is a longitudinal sectional view showing an optical module using a ferrule block in a third preferred embodiment according to the present invention.

FIG. 9 is a longitudinal sectional view showing an optical module using a ferrule block in the third preferred embodiment according to the present invention.

In FIG. 6 to FIG. 8, an explanation has been given with an example in which the shell is provided with a male engaging section and the ferrule block body is provided with a female engaging section, but as in a ferrule block 81 in the third preferred embodiment shown in FIG. 9, a substantially annular concave section 83 may be provided as a female engaging section on the outer periphery of the shell 82, and a substantially annular or substantially annular piece-shaped claw 85 may be provided as a male engaging section on the inner periphery of the large-diameter section 7 of the ferrule block body 84.

Fourth Preferred Embodiment

Next, a fourth preferred embodiment will be explained.

Figure 10:
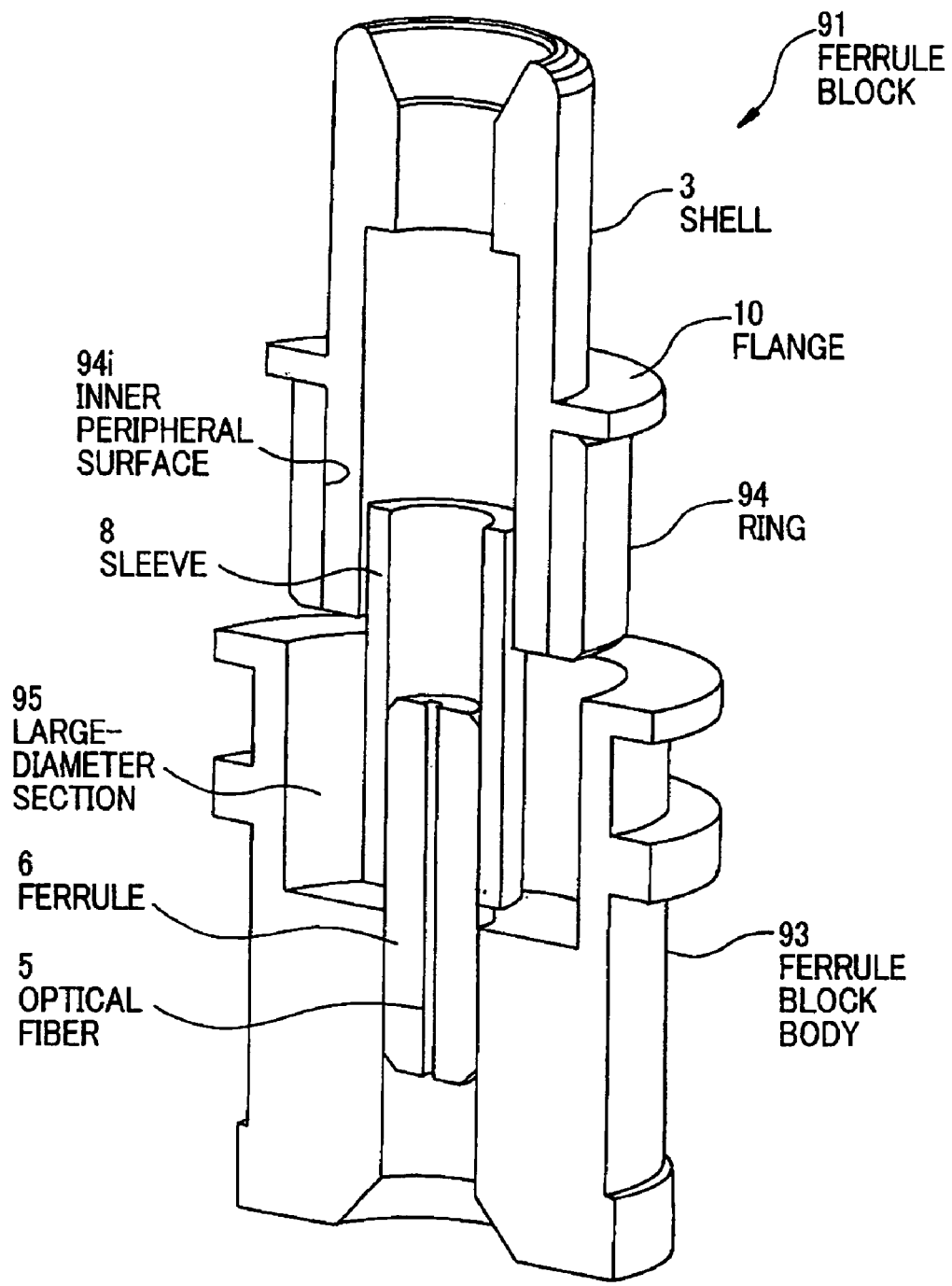
FIG. 10 is a longitudinal sectional view showing a shell and a ferrule block body before press fitting in a fourth preferred embodiment according to the present invention.
Figure 11:
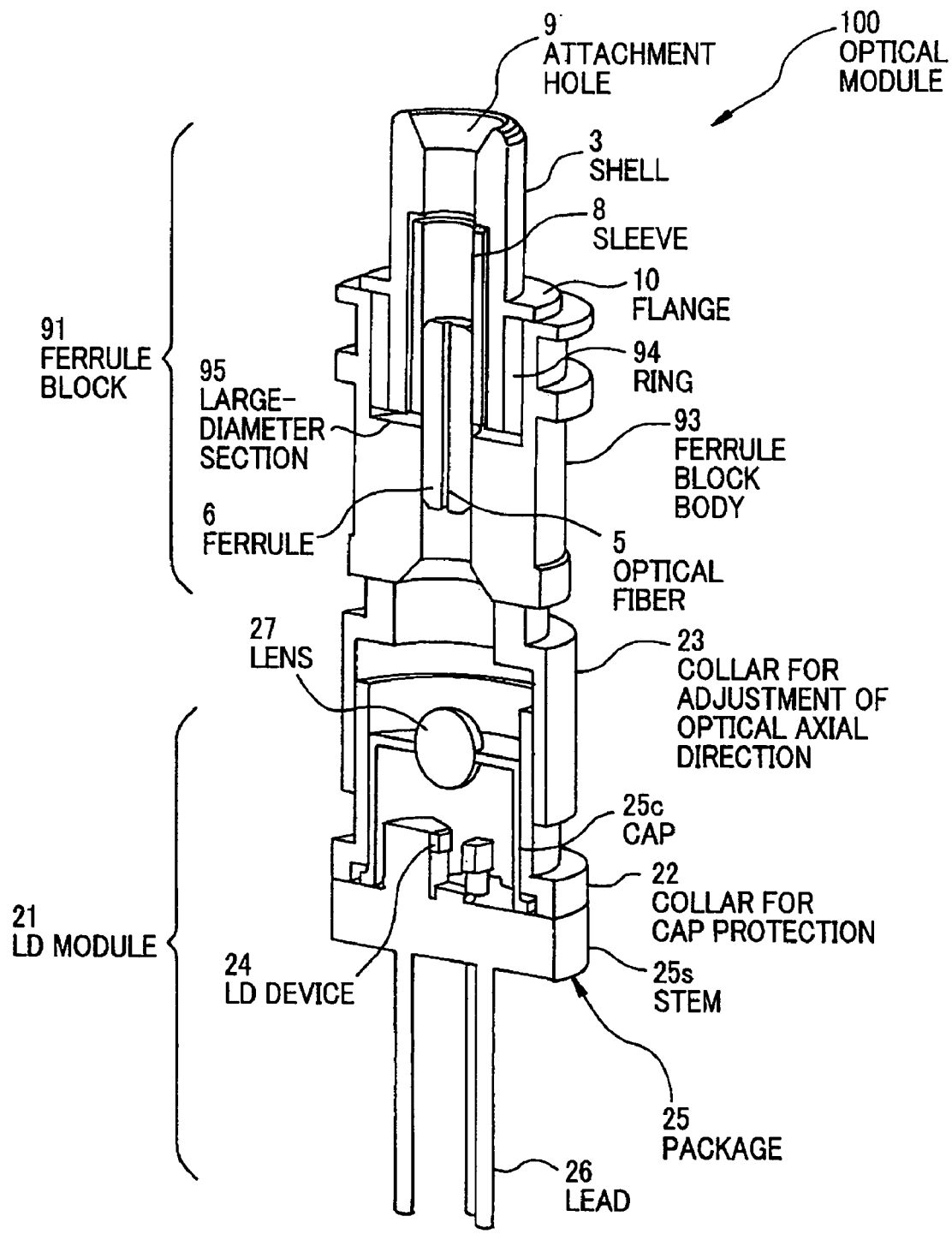
FIG. 11 is a longitudinal sectional view showing an optical module using a ferrule block in the fourth preferred embodiment according to the present invention.

FIG. 10 is a longitudinal sectional view showing a shell and a ferrule block body before press fitting in the fourth preferred embodiment according to the present invention.

As shown in FIG. 10, the ferrule block 91 primarily includes the shell 3, a ferrule block body 93, and a cylindrical ring (metal ring) 94 made of a metal such as SUS, which is provided at the other end of the outer periphery of the shell 3 to press fit the shell 3 into the ferrule block body 93.

The inner peripheral surface 94i of the ring 94 is subjected to surface roughing so that it forms a rough surface, such as a textured surface, a surface having asperities, or a jagged surface. Alternatively, the inner peripheral surface 94i of the ring 94 may be of key shape. Its purpose is to improve the gripping engagement between the shell 3 made of plastic and the ring 94 made of metal.

On the other hand, the ferrule block body 93 has a large-diameter section 95 formed within the one end thereof, which is larger than the large-diameter section 7 formed in the ferrule block body 2 in FIG. 2 to FIG. 4 by a diameter of the ring 94.

Attachment of the ring 94 to the shell 3 is done by insert molding the ring 94 into the shell 3. Specifically, the ring 94 whose inner peripheral surface 94*i* is subjected to surface roughing is put beforehand in a mold not shown for molding the shell 3, then a liquid resin is poured into the mold containing the ring 94, and then the resin poured is cooled to attach the ring 94 to the shell 3, wherein the shell 3 is integral with the ring 94.

When the shell 3 equipped with the ring 94 is press fitted from the other end side into the large-diameter section 95 of the ferrule block body 93, the ferrule block 91 in such a state as shown in FIG. 10 is obtained. It should, however, be noted that the optical fiber 5, the ferrule 6, and the sleeve 8 are already fixed to the ferrule block body 93.

An optical module 100 using the ferrule block 91 comprises the ferrule block 91, the LD module 21, the collar 22 for cap protection, and the collar 23 for adjustment of optical axial direction.

Since the ferrule block 91 has the ring 94 made of metal provided in the shell 3 made of plastic, the shell 3 can be press fitted into the large-diameter section 95 of the ferrule block body 93 although plastics normally cannot be press fitted into metal. Therefore, the ferrule block 91 has a high reliability in retaining the fixing of the shell 3 to the ferrule block body 93.

Fifth Preferred Embodiment

Finally, a fifth preferred embodiment will be explained.

Figure 12:
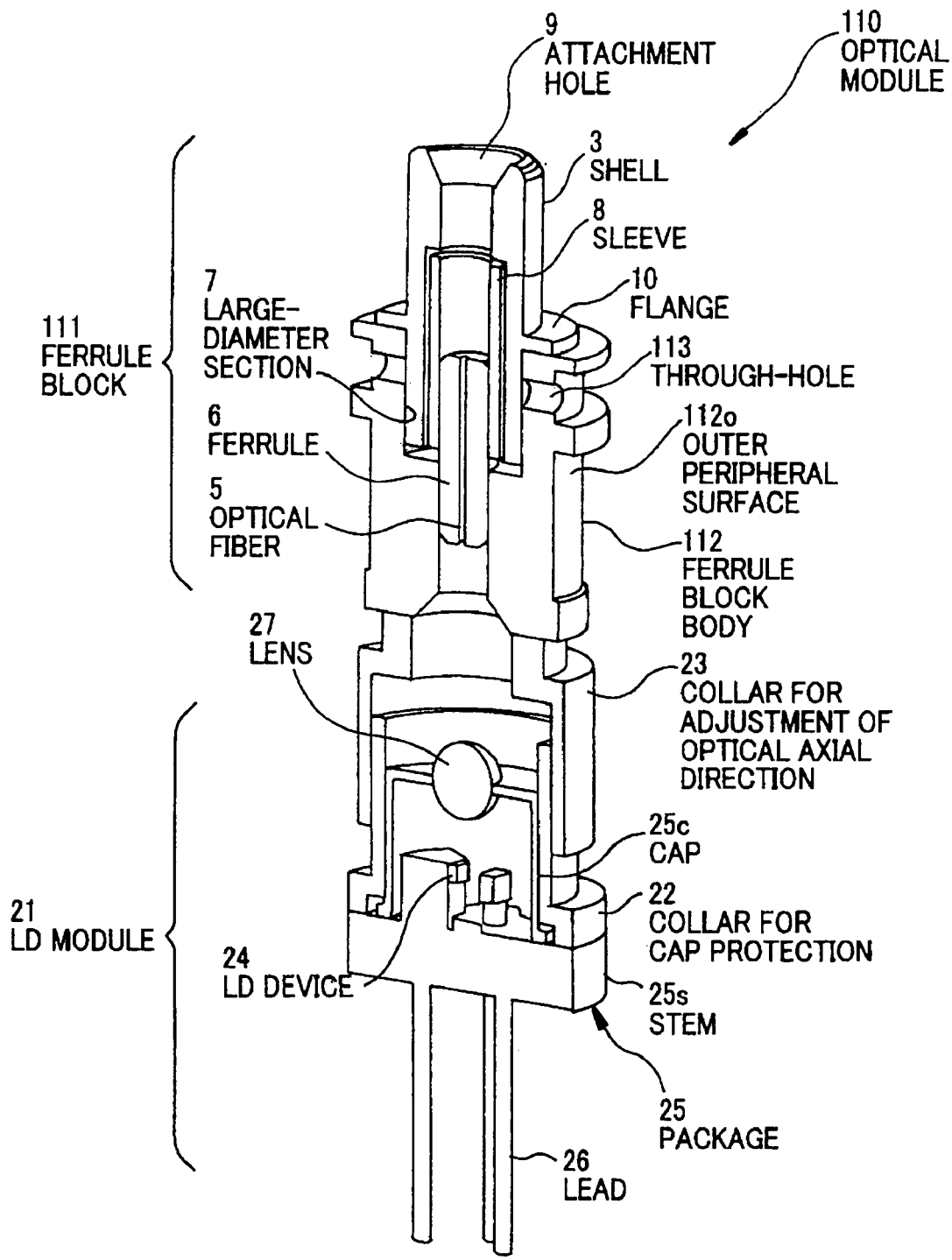
FIG. 12 is a longitudinal sectional view showing an optical module using a ferrule block in a fifth preferred embodiment according to the present invention.
Figure 13:
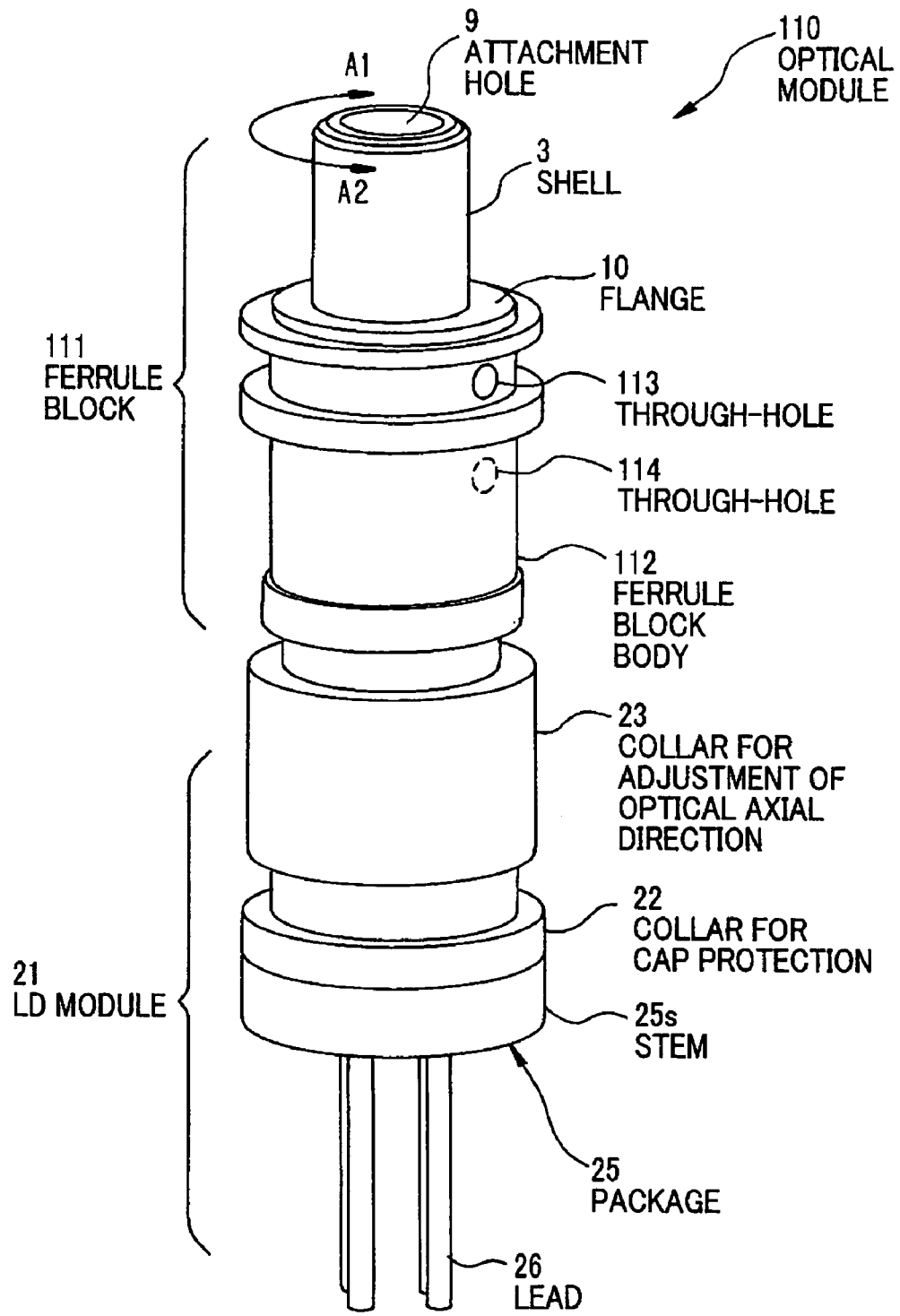
FIG. 13 is an outline view of the arrangement of FIG. 12.

FIG. 12 is a longitudinal sectional view showing an optical module using a ferrule block in the fifth preferred embodiment according to the present invention, and FIG. 13 is an outline view of the arrangement of FIG. 12.

As shown in FIG. 12 and FIG. 13, the ferrule block 111 has a through-hole 113 formed in the ferrule block body 112, the through-hole 113 penetrating diametrically from the one end side of an outer peripheral surface 112*o* of the ferrule block body 112 to the large-diameter section 7 which is an insertion hole into which the other end of the shell 3 is inserted.

FIG. 12 illustrates an example in which two through-holes 113 are symmetrically formed in the ferrule block body 112, but at least one through-hole 113 need only be formed. Further, instead of the through-hole 113, a through-hole 114 may be provided, as is the through-hole 113, on the other end side relative to the through-hole 113 of the ferrule block body 112, as indicated by a dotted line in FIG. 13.

An optical module 110 using the ferrule block 111 comprises the ferrule block 111, the LD module 21, the collar 22 for cap protection, and the collar 23 for adjustment of optical axial direction.

To fix the shell 3 to the ferrule block body 112, an adhesive is applied to the inner peripheral surface of the large-diameter section 7 or the other end of the shell 3, and then the shell 3 is inserted into the large-diameter section 7. At the moment, in the ferrule block 111, if the shell 3 is rotated on the optical axis (in the directions of A1 and A2 in FIG. 13), the adhesive can be seen from the through-hole 113 (or the through-hole 114). Accordingly, the amount of the adhesive applied can be checked for adequateness, and consequently the shell 3 and the ferrule block body 112 are prevented from being poorly bonded due to an inadequate amount of the adhesive.

In the above preferred embodiments, an explanation has been given with an example in which each ferrule block is attached to the LD module 21, but the above-mentioned each ferrule block may be attached to any optical device module including, but not limited to an light emitting diode (LED) module housing an LED as an optical device or a photodiode (PD) module using a PD as an optical device. Also, a ferrule block configured by any combination of the respective preferred embodiments described in FIG. 6 to FIG. 13 may be used.

Although the invention has been described with respect to the specific preferred embodiments for complete and clear disclosure, the appended claims are not to be thus limited but are to be construed as embodying all modifications and alternative constructions that may occur to one skilled in the art which fairly fall within the basic teaching herein set forth.

What is claim is:

1. A ferrule block, comprising:
   a ferrule block body which is attachable to an optical device module, wherein the ferrule block body houses a ferrule and an optical device for sending or receiving a light signal and for optically coupling to an optical fiber communicating between the optical device module and an external optical communication system;
   a sleeve for accommodating the ferrule; and
   a shell made of an insulating material which is provided at a tip of the ferrule block body and covers an outer periphery of the sleeve,
   wherein the shell comprises an outer periphery, two ends, and a flange disposed along the outer periphery of the shell such that the outer periphery of the shell extends from the flange in two directions towards the two ends, wherein the flange hits against the tip of the ferrule block body and the flange is configured to abut an outer frame of an optical connector.

2. The ferrule block according to claim 1, wherein:
   the insulating material is ceramic and the shell is press fitted and fixed to the ferrule block body.

3. The ferrule block according to claim 1, wherein:
   the insulating material is plastic.

4. The ferrule block according to claim 3, wherein:
   the shell is inserted into the ferrule block body and fixed thereto by an adhesive.

5. The ferrule block according to claim 3, wherein:
   the shell and the ferrule block body are each provided with respective engaging sections which engage with each other.

6. The ferrule block according to claim 3, wherein:
   the ferrule block body is provided with a through-hole which penetrates from an outer periphery of the ferrule block body to an insertion hole, into which the shell is inserted.

7. The ferrule block according to claim 4, wherein:
   the shell and the ferrule block body are each provided with respective engaging sections which engage with each other.

8. The ferrule block according to claim 1, wherein:
   the sleeve is a split sleeve.

9. The ferrule block according to claim 1, wherein:
   the sleeve is configured to accommodate a ferrule of the external optical communication system.

10. A ferrule block, comprising:
   a ferrule block body which is attachable to an optical device module, wherein the ferrule block body houses an optical device for sending or receiving a light signal, and for optically coupling to an optical fiber communicating between the optical device module and an external optical communication system;

a shell made of an insulating material which is provided at a tip of the ferrule block body, wherein the insulating material is plastic, wherein the shell comprises an outer periphery, two ends, and a flange disposed along the outer periphery such that the outer periphery extends from the flange in two directions towards the two ends, wherein the flange hits against the tip of the ferrule block body and the flange is configured to abut an outer frame of an optical connector; and a metal ring for press fitting the shell into the ferrule block body which is provided on the outer periphery of the shell.

11. The ferrule block according to claim 10, wherein:
the shell and the ferrule block body are each provided with respective engaging sections which engage with each other.

12. The ferrule block according to claim 10, wherein:
the metal ring is insert molded into the shell.

13. An optical module, comprising:
a ferrule block comprising:
a ferrule block body which is attachable to an optical device module, wherein the ferrule block body houses a ferrule and an optical device for sending or receiving a light signal and for optically coupling to an optical fiber communicating between the optical device module and an external optical communication system; and
a sleeve for accommodating the ferrule: and
a shell made of an insulating material which is provided at a tip of the ferrule block body and covers an outer periphery of the sleeve,
wherein the shell comprises an outer periphery, two ends, and a flange disposed along the outer periphery of the shell such that the outer periphery of the shell extends from the flange in two directions towards the two ends, wherein the flange hits against the tip of the ferrule block body and the flange is configured to abut an outer frame of an optical connector.

14. The optical module according to claim 13, wherein:
the insulating material is ceramic and the shell is press fitted and fixed to the ferrule block body.

15. The optical module according to claim 13, wherein:
the insulating material is plastic.

16. The optical module according to claim 15, wherein:
the shell is inserted into the ferrule block body and fixed thereto by an adhesive.

17. The optical module according to claim 15, wherein:
the shell and the ferrule block body are each provided with respective engaging sections which engage with each other.

18. The optical module according to claim 16, wherein:
the shell and the ferrule block body are each provided with respective engaging sections which engage with each other.

19. The optical module according to claim 15, wherein:
the ferrule block body is provided with a through-hole which penetrates from an outer periphery of the ferrule block body to an insertion hole, into which the shell is inserted.

20. The optical module according to claim 13, wherein:
the sleeve is a split sleeve.

21. The optical module according to claim 13, wherein:
the sleeve is configured to accommodate a ferrule of the external optical communication system.

22. An optical module comprising:
a ferrule block comprising:
a ferrule block body which is attachable to an optical device module, wherein the ferrule block body houses an optical device for sending or receiving a light signal, and for optically coupling to an optical fiber communicating between the optical device module and an external optical communication system;
a shell made of an insulating material which is provided at a tip of the ferrule block body, wherein the insulating material is plastic, wherein the shell comprises an outer periphery, two ends, and a flange disposed along the outer periphery such that the outer periphery extends from the flange in two directions towards the two ends, wherein the flange hits against the tip of the ferrule block body and the flange is configured to abut an outer frame of an optical connector; and
a metal ring for press fitting the shell into the ferrule block body which is provided on the outer periphery of the shell.

23. The optical module according to claim 22, wherein:
the shell and the ferrule block body are each provided with respective engaging sections which engage with each other.

24. The optical module according to claim 22, wherein:
the metal ring is insert molded into the shell.

* * * * *